W. JONES.
Harvester.
No. 8,207.
2 Sheets—Sheet 1.
Patented July 8, 1851.
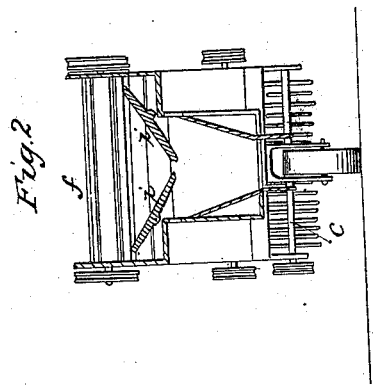
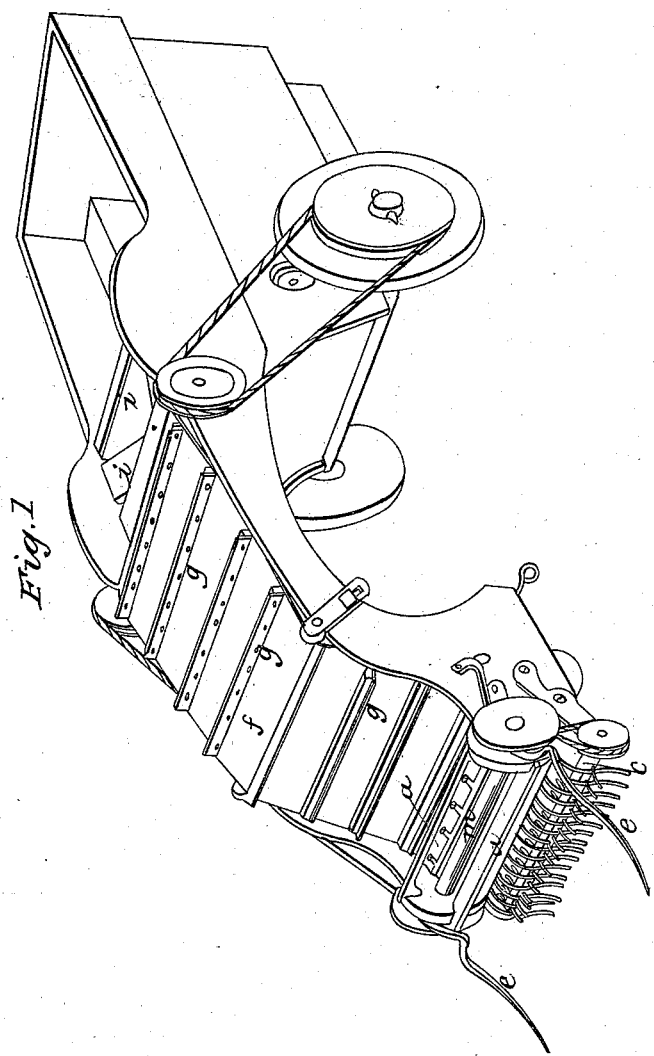

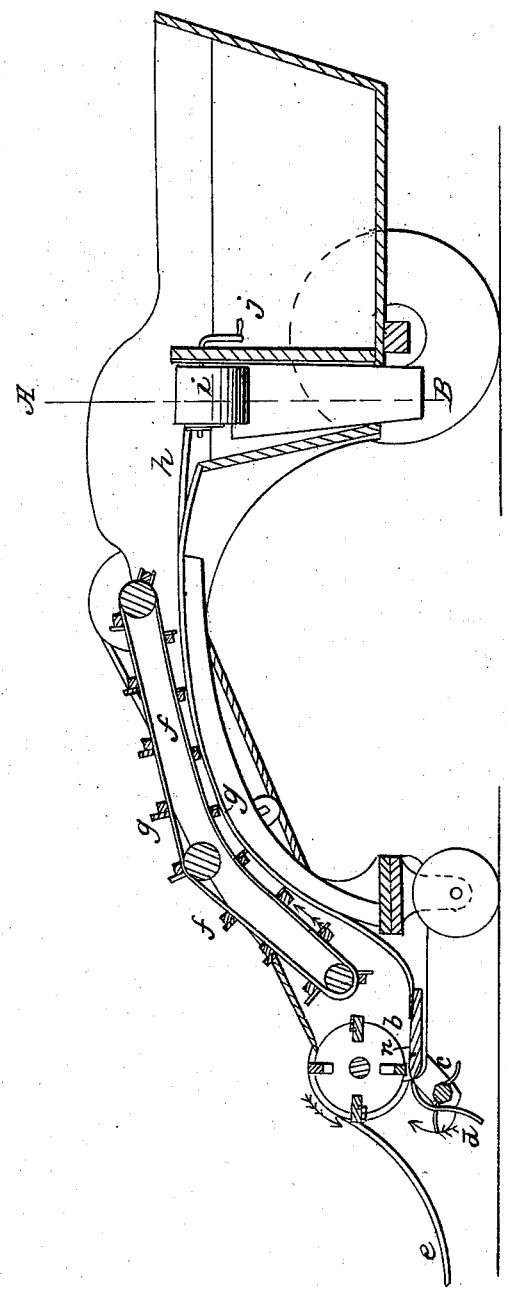

UNITED STATES PATENT OFFICE.

WILLIAM JONES, OF BRADFORD, VERMONT.

IMPROVEMENT IN HARVESTING-MACHINES.

Specification forming part of Letters Patent No. 8,207, dated July 8, 1851.

*To all whom it may concern:*

Be it known that I, WILLIAM JONES, of Bradford, in the county of Orange and State of Vermont, have invented certain new and useful Improvements in the Construction of Grain-Harvesting Machines; and I do hereby declare that the following is a full, clear, and exact description of the principles or character which distinguishes it from all other things before known, and of the usual manner of making, modifying, and using the same, reference being had to the accompanying drawings and letters marked thereon, forming a part of this specification, in which—

Figure 1 is a perspective view; Fig. 2, a transverse section through the line A B, and Fig. 3 a longitudinal section. In each of these figures where the same parts are shown they are designated by the same letters of reference.

The nature of my invention consists, first, in the use of rotating cutters on a horizontal shaft, in connection with a rotating rake under the platform, the teeth of which pass between other teeth projecting downward from the platform, the cutters and rake rotating in opposite directions, the cutters bending over the tops of the grain, and the rake raising the fallen grain, both acting conjointly in bringing all the grain under the action of the cutters, and from thence under the endless apron, and leaving none on the ground uncut; secondly, and lastly, the novel manner of constructing the machine so as to have the horses or animal-power for propelling geared under or between the hind and front wheels of the machine, so as to carry the grain over them, whereby there is more ease and regularity in the motion of the whole machinery, it can be guided with much more certainty, and the animals on either side do not disturb the standing grain, and they exert their power to a better advantage than either of the old ways of gearing them on the side or behind the machine.

I construct my machine in about the form represented in the drawings, and provide it with two main wheels to support its after part and one wheel to support its front part. The latter wheel is used as a steering-wheel to guide and change the direction of the machine, which can be operated upon by any convenient contrivance for that purpose.

The cutter consists of one or more knives, $a$ $a$, secured to arms which may be placed a little spirally upon two circular disks on the shaft $m$. These cutters rotate very rapidly on their gudgeons above the platform $b$, and the edge of the platform is faced with steel $n$, which forms a cutting-edge. The rake $c$ rotates also rapidly under the platform in the opposite direction to the cutters. The teeth of the rake rotate between other teeth, $d$, projecting downward from the edge of the platform, and serve the purpose of cutting the fallen grain and bringing it under the action of the cutters, which would otherwise be passed over and not cut. The metal rods $e\ e$, flaring out in front from each side of the carriage or machine, which can be turned over out of the way when the machine is not in operation, or when it is necessary to turn an angle, are for the purpose of separating and collecting together the standing grain and bringing a larger quantity under the action of the cutters, so that a wider space will be mowed than the width of the machine. The cutters, rake, and platform may be all attached to a movable frame, so as to allow of their being raised or lowered to adapt the machine to various kinds of grain; or the wheel supporting the front part of the machine, used as a steering-wheel, may be hung into an adjustable frame, which will answer the same purpose.

The endless apron $f$ is provided with slats $g$, which draw the grain between it and the under side of the curved frame, conducting it over the horses and delivering it upon a table, $h$, where a boy or conductor of the machine stands, who places it straight over the discharger, and when a sufficient quantity has been collected to form a bundle he discharges it. The discharger consists merely of two movable leaves, $i\ i$, which, when closed, form a platform or table to receive the grain, but which are hung on hinges on their outer ends, and open downward, so as to discharge the grain through the bottom of the machine.

The leaves of the platform can be operated upon by the cranks $j\ j$ by hand; or they may be geared with the moving machinery, so as to open and shut at the proper time for discharging the usual quantity for forming a sheaf.

If it is desirous to thrash the grain on the field, a thrashing-machine may be inserted in the place of the discharger.

The cutter, rake, and endless apron are driven by bands passing from the main wheels, and the speed can be regulated as may be found best in practice. The cutters and rake however, must be driven sufficiently fast in order to cut all the grain and not allow the machine to pass over any uncut, and the faster they are driven (provided, of course, not so fast as to injure the machine or diminish too much of the power) the better the machine will operate.

The speed of the endless apron can of course be regulated to suit the movement of the machine so as to conduct the grain to the discharger as fast as it is cut.

Operation: As the machine advances, the cutters revolving rapidly in the direction of the arrows bends the heads of the grain over to the action of the cutters, and the rake revolving in the opposite direction to the cutters between the teeth projecting from the platform lifts the fallen grain and draws it all under the action of the cutters between the cutters and the platform, and from thence it is conducted by the endless apron to the after part of the machine, and is discharged in bundles, ready to be tied up into sheaves.

Having thus fully described the construction and operation of my grain-harvester, what I claim therein, and desire to secure by Letters Patent, is—

1. The use of rotating cutters, in connection with the rotating rake and teeth $d$, operating substantially as described.

2. The novel manner of gearing the horses or animal-power under the machine so as to conduct the grain over them and discharge it in a straight line in the wake of the machine, substantially as herein described and made known.

In testimony whereof I have hereunto signed my name before two subscribing witnesses.

WM. JONES.

Witnesses:
 THOS. DONOHO,
 GEO. R. WEST.